(12) United States Patent
Habibi-Naini et al.

(10) Patent No.: US 7,198,748 B2
(45) Date of Patent: Apr. 3, 2007

(54) INJECTION MOLDING MACHINE AND INJECTION MOLDING METHOD FOR MANUFACTURING FOAMED SHAPED PARTS

(75) Inventors: Sasan Habibi-Naini, Aachen (DE); Oliver Pfannschmidt, Bad Oeynhausen (DE); Christian Schlummer, Freiburg (DE)

(73) Assignee: Peguform GmbH, Bötzingen (DE)

( * ) Notice: Subject to any disclaimer, the term of this patent is extended or adjusted under 35 U.S.C. 154(b) by 224 days.

(21) Appl. No.: 10/477,677

(22) PCT Filed: May 10, 2002

(86) PCT No.: PCT/EP02/05142

§ 371 (c)(1),
(2), (4) Date: Nov. 12, 2003

(87) PCT Pub. No.: WO02/092314

PCT Pub. Date: Nov. 21, 2002

(65) Prior Publication Data

US 2004/0145074 A1    Jul. 29, 2004

(30) Foreign Application Priority Data

May 11, 2001  (EP) .................................. 01111504

(51) Int. Cl.
*B29C 45/48*  (2006.01)
*B29C 45/50*  (2006.01)
*B29C 45/60*  (2006.01)
*B29C 45/70*  (2006.01)

(52) U.S. Cl. ............................. 264/328.18; 264/328.1; 425/209

(58) Field of Classification Search ........... 264/328.18; 425/209
See application file for complete search history.

(56) References Cited

U.S. PATENT DOCUMENTS

| 3,792,839 | A |   | 2/1974  | Gidge |
| 3,972,970 | A | * | 8/1976  | Taylor ..................... 264/45.9 |
| 4,058,297 | A | * | 11/1977 | Seufert ..................... 366/81 |
| 4,357,025 | A | * | 11/1982 | Eckart ..................... 165/9 |
| 5,297,948 | A |   | 3/1994  | Sadr |

FOREIGN PATENT DOCUMENTS

| DE | 198 53 021  | 7/2000 |
| EP | 1 072 375   | 1/2001 |
| JP | 06339974    | 12/1994 |
| WO | WO 98/31521 | 7/1998 |

\* cited by examiner

*Primary Examiner*—Christina Johnson
*Assistant Examiner*—Monica A Huson
(74) *Attorney, Agent, or Firm*—Henry M. Feiereisen; Ursula B. Day

(57) ABSTRACT

The injection molding machine comprises a screw plunger (3), which rotates inside an injection unit (2), wherein the screw plunger (3) has, downstream from a metering zone a porous or permeable section (16) which can be charged with a physical expanding agent via an expanding agent feed device (18) in the screw shaft of the screw plunger (3) and which two-dimensionally introduces the expanding agent into the melt flow for molding of foamed shaped parts made of polymeric materials in an injection molding machine by an injection molding method.

22 Claims, 1 Drawing Sheet

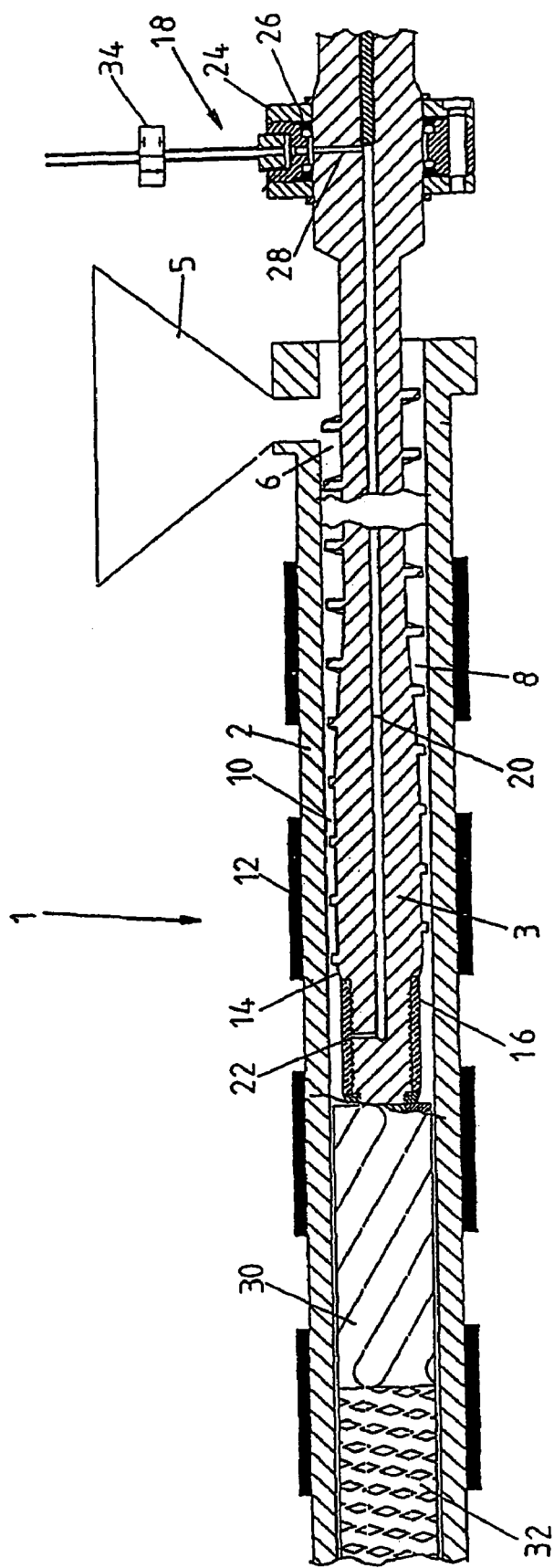

INJECTION MOLDING MACHINE AND INJECTION MOLDING METHOD FOR MANUFACTURING FOAMED SHAPED PARTS

BACKGROUND OF THE INVENTION

The invention concerns an injection molding machine and an injection molding method using a physical blowing agent for the injection-molding of foamed parts.

The injection moulding methods used to manufacture moulded parts include not only compact injection moulding, but also foamed injection moulding and other special methods. Structural foam moulded parts have in contrast to compact components a sandwich structure, i.e. a more or less compact skin and a closed-cell core. They are characterized by good material properties and, in addition, are of economic interest. For example, their geometrical moment of inertia is displaced to the surface layer, thus giving them a higher specific rigidity than compact parts. Moreover, owing to their low warpage, reduced internal stresses, and few sink marks, ribbed moulded parts with sudden transitions in wall thickness can be manufactured with a high degree of dimensional stability virtually without problems. And because foaming gives rise to an internal melting pressure, dwell pressure no longer needs to be applied, with the result that large-area moulded parts can be produced with low locking pressures on smaller machines. The reduction in density leads not only to savings in raw material costs, but also to a reduced component weight. Sound and heat insulation as well as improved resistance to the manufacturing media round off the properties of foamed components.

A thermoplastic foam is generated with the aid of blowing agents which can be dosed in various ways to the polymer melt so that they mix to form a single-phase solution. Analogously to the conventional injection molding method, using standard injection molding technology, the quantity of material needed to charge the mould chamber is melted in the plasticizing cylinder. The plasticizing cylinder of a standard injection molding machine is characterized by a cylinder with nozzle and a plasticizing screw with a back flow stop. During the so called plasticizing phase, plastic granulate is processed from the feed hopper over the back flow stop to the nozzle by rotating the plasticizing screw. The plastics material is melted by heat transmitted from the walls of the plasticizing cylinder. While rotating, the plasticizing screw moves in axial direction against a defined ram pressure in the direction of the feed hopper and releases thereby volume in the screw's antechamber. After having completed the dosing phase, the material dosed in the screw's antechamber is injected in the most cases with high speed into the cavity of the tool by the axial movement of the plasticizing screw. Due to the pressure drop during the flow of the melt into the cavity, bubbles are generated by the expansion of the blowing or expanding agent. Thereby a foamed structure is developed. The foam structure is fixed by cooling or heating steps depending on the type of material used, such as elastomeric or duroplastic materials. The obtainable foam densities and the plant technology needed for the manufacture depend on the type and quantity of the blowing agent used.

There are basically two types of blowing agent, chemical and physical, whereby the difference between the two lies more in the type of dosing than in the initiation of foaming.

Chemical blowing agents are mixed in the solid state with polymer granulate and decompose under the action of heat, releasing one or more fluids in the process, in most cases nitrogen, carbon dioxide, or water. The drawbacks are the other products of decomposition that can lead to degradation of the polymer matrix, a falling off of mechanical properties, discoloration in the component, and corrosion and soiling of the mould. Furthermore, the relatively low gas output from the decomposition of chemical blowing agents achieves only limited degrees of foaming.

Fluids that are dosed directly into the polymer melt are called physical blowing agents. These can be inert gases such as nitrogen or carbon dioxide, also hydrocarbons such as pentane, as well as water. Physical blowing agents can obtain considerably higher degrees of foaming. And because there are no decomposition products, there can be no discoloration, and no detriment to mechanical properties. The drawbacks always listed in the past were the complex plant technology and the difficulty in controlling the dosed quantities owing to the unsteady state of the injection molding process.

Before a thermoplastic foam can be generated in the injection molding process, a polymer/blowing agent solution must be generated under high pressure.

Here, the expanding fluid is brought into contact with the low-viscosity polymer. Depending on the process conditions, diffusion processes then take place, leading to the absorption of the blowing agent in the melt. After enough time has passed, a single-phase polymer/blowing agent solution has formed.

The methods used today differ greatly in the way they bring the expanding fluid into contact with the melt.

One way of achieving a highly uniform solution of blowing agent in the polymer is to charge the material with expanding fluid beforehand. Here, a high-pressure gasification system is used to charge the polymer with carbon dioxide before the polymer is processed. The plastic granulate is pressurized to a predefined value with $CO_2$ in an autoclave at room temperature, whereby the polymer absorbs gas owing to the difference in concentration and pressure. The concentration of gas in the polymer is a function of the gasification time, amongst other factors. Once the saturation concentration has been reached, the pressure is reduced to the ambient value, and the gas-charged polymer is dosed to the injection molding machine via the feed hopper. The material is then melted and homogenized in the plasticizing cylinder, whereby the rise in pressure causes the dissolved gas to lie along the cylinder. On leaving the nozzle, the polymer foams as a result of the rapid drop in pressure.

The drawbacks with this method of precharging in autoclaves lie in the batch charging of the granulate (making it inappropriate for industrial applications) and the lack of flexibility with respect to time (the blowing agent diffuses continuously out of the polymer). So this method does not find practical application in industry.

Another method makes it possible to dose the blowing agent directly in the screw's antechamber. Underlying this method is a special gas injection nozzle flanged between the cylinder and the mould injection nozzle (DE 198 53 021 A1). The heart of this gas injection nozzle is formed by an annulus of porous or gas permeable sintered metal through which the melt passes during the injection process. A torpedo centered in the melt channel divides the melt upstream of the annulus for the best fluid engineering properties and recombines the two flows without dead corners once they have passed the annulus. If necessary, static mixer and shear elements can be installed for the homogeneous distribution of the polymer/blowing agent solution. The gas is fed by a gas dosing station that can regulate the mass flow to vary the proportion of blowing agent in the melt, thus obtaining various degrees of foaming.

Another technology is based on the injection of a physical blowing agent into the plasticizing cylinder of an injection molding machine (EP 0 952 908 A2). Here, the blowing agent is injected through several axially arranged radial apertures in the plasticizing cylinder's melt chamber. Upstream of each of these apertures is a controllable valve that can open and close the connection to the blowing agent supply. A cascade controller then correlates the controlled valve states with the position of the screw during the dosing process, i.e. the valves are opened and closed in succession. The purpose is to obtain the most uniform injection of the blowing agent as possible into the melt. Long mixing zones then homogenize the blowing agent/polymer solution, which in the ideal case is ready for the mould injection process as a single-phase substance.

Another process for the foaming of plastic parts implies the injection of a blowing agent in the area of an extruder (EP 1 072 375 A2). The blowing agent is added to the molten polymer through a porous region in the screw of the extruder. This process is used predominantly for the continuous production of plastic profiles by an extrusion process. To allow for injection molding type applications, such an extruder has to be combined with a plunger injection unit. The blowing agent is added in the extruder. In order to adapt this solution to a batch process, requires increased machinery and plant equipment alongside with the need for a special machine adapted specifically to the requirements.

The drawbacks of this method with the gas injection nozzle lie in the homogenization of the melt. During the mould injection process, there is, of course, only this injection time available to charge the melt with the blowing agent. And because foamed injection molding applications generally require a high mould injection speed in order to generate a high nucleation density, these times may not be long enough—despite the short diffusion paths in the annulus—to obtain an adequate and homogeneous sorption. On the other hand, feeding the blowing agent during the dosing phase is also problematic because the volume of the melt in the annulus is given by the geometry. So if the volume of the injection molded part is larger than the volume of the annulus, then this difference in volume is not charged with the blowing agent, and the molded part's foam structure will become inhomogeneous. If, on the other hand, the volume is smaller, then a part of the mass will be charged during two successive dosing phases. This is not associated with any problems as long as a single dosing cycle is adequate to enrich the melt with the blowing agent in the saturation state. In addition, static mixing elements involve the risk of damage to the polymer matrix caused by friction heat when high shearing forces act on thermally sensitive materials. Owing to the high pressure during the mould injection process a dosing station is needed to compress the expanding fluid to the appropriate high value.

The main drawback of this variant method injecting gas into the plasticizing cylinder is that a special injection molding machine becomes necessary. The cascade control system requires a correlation interface with the machine controller, as is not the case with customary machines. Because the melt is enriched with the blowing agent during the dosing phase, in the course of which the screw completes its axial travel back, several gas injection ports with the correspondingly complex valve technology are needed to obtain an approximately uniform dosing of the blowing agent in the melt. This complex plant technology does not only require high investment costs; it is a well-known fact that the more complex the applied technology becomes, the greater its susceptibility to malfunctions in the production run, and the higher the servicing costs. Guaranteeing that the blowing agent can disperse adequately in the melt after the point injection requires unusual mixer zones, which in turn require a special screw with long mixing elements and, as a consequence of the longer screw lengths, a special drive unit as well. Also needed is a dosing unit to inject the expanding fluid.

SUMMARY OF THE INVENTION

The invention is based on the problem of how to obtain high reproducibility and process reliability in introducing and distributing a physical blowing agent uniformly into the melt flow of an injection molding machine so that a homogeneous polymer/blowing agent solution is the result—and this with a conventional injection molding machine.

The invention resolves this problem by providing that the plasticizing screw downstream of a metering zone has a porous or permeable section which is pressurized with the blowing agent supplied by an blowing agent feed device in the shaft of the plasticizing screw and which introduces the blowing agent through the whole surface of the melt.—

This invention makes it possible to use a conventional injection molding machine, after minor modifications, to manufacture physically expanded structural foam molded parts that are characterized by a compact skin and a foamed core and so combine improved material properties with savings in weight, material, and therefore costs when compared with compact components. Furthermore, no intervention is needed in the machine controller, so the investment costs are low.

Compared with the state of the art, the invention offers the following advantages:
  low investment costs because no cost-intensive special machine is needed, but solely the replacement of the plasticizing screw of a conventional injection molding machine,
  a uniform introduction of blowing agent owing to a flat, rotating gas injection zone that also travels during the dosing phase of polymer,
  a high degree of homogenization owing to intensive shearing and mixing processes, whereby the effective length of the screw's mixing and shearing zones remains unchanged in the course of the gas injection,
  the optimal solution behavior owing to long diffusion times and large diffusion areas with short diffusion paths,
  process reproducibility independently of the dosing volume,
  a high blowing agent efficiency.

As a further aspect of the invention, a method for injection molding foamed molded parts is provided by introducing a polymer material into an injection molding unit which includes a plasticizing screw movable in axial direction and rotating within a plasticizing cylinder, melting, compressing and homogenizing the polymer thereby forming a polymer melt flow within an end portion of a melting zone of the injection unit, introducing a physical blowing agent into the melt flow via a gas injection area feed zone in the plasticizing screw; wherein a portion of the screw is configured as a permeable section defining the gas injection area that rotates and moves alone an axial direction in correspondence with the plasticizing screw, and injecting the homogenized polymer/blowing agent solution into a mold.

Because the blowing agent in the porous or permeable section is introduced through the whole surface of the polymer melt, a uniform introduction of blowing agent is possible when the polymer is being dosed. The result is an improved solution behavior owing to long diffusion times and large diffusion areas with short diffusion paths. In addition, both a high reproducibility of the injection molding process independently of the dosing volume and the optimal utilization of the blowing agent can be established. Finally, the invention has the advantage of low investment costs because no cost-intensive special machine is needed, but solely the replacement of the plasticizing screw in the conventional injection molding machine. An extended plasticizing cylinder is not needed either. A length for the plasticizing cylinder of about 20 to 25 times of the plasticizing screw's external diameter is enough.

One advantageous feature is that the diameter of the plasticizing screw is smaller in the area of its porous or permeable section. The resulting greater depth of the screw base makes it possible owing to the polymer melt's low pressure level in the gas injection area to feed the blowing agent directly and without the need for a dosing station.

One advantageous feature is that the blowing agent is fed to the plasticizing screw during the dosing phase via a high-pressure sealing case enclosing radially the plasticizing screw. This physical blowing agent is provided as a fluid.

The high-pressure sealing case receives the blowing agent from at least one pressure cylinder. This has the advantage that no dosing station is needed.

The high-pressure sealing case traverses, without rotating, in the axial direction simultaneously with the axial movement of the plasticizing screw. This makes a uniform introduction of blowing agent possible owing to the flat, rotating gas injection area that also moves in the axial direction when the polymer is dosed.

The polymer/blowing agent solution is homogenized by the plasticizing screw's mixing and shearing elements whose effective lengths remain unchanged during the course of gas injection. The blowing agent is injected during the dosing phase.

BRIEF DESCRIPTION OF THE DRAWING

FIG. 1 is a sectional side view of the injection molding machine according to the invention.

DETAILED DESCRIPTION OF PREFERRED EMBODIMENTS

The following gives a more detailed description of the invention with reference to FIG. 1.

The only figure shows a plasticizing screw (3) of an injection molding machine (1) with a plasticizing screw (3) rotating in the plasticizing cylinder (2).

A feed hopper (5) introduces the polymer granulate to the plasticizing screw (3), from which the granulate is drawn into the feed zone (6). External cylinder heating (12) assists the adjoining compression zone (8) and metering zone (10) to melt, compress, and homogenize the polymeric material so that a polymer melt is available at the end of the metering zone (10) with thermal and material homogenization. At the end (14) of the plasticizing screws (3) metering zone (10), the screw base is abruptly increased, i.e. the plasticizing screw's (3) diameter is abruptly reduced. Installed in this area of reduced plasticizing screw (3) diameter is a porous or permeable section (16) that is pressurized with a physical blowing agent supplied by an blowing agent feed device (18) through a bore (20). The blowing agent is introduced into the melt through the surface of the permeable section.

The porous or permeable section (16) functions as the contact surface between the blowing agent and the polymer melt. The change in the screw base's depth leads to a drop in pressure in this section (16). The compressed blowing agent, e.g. an expanding fluid, is fed through the bore (20) along the screw's longitudinal axis and one or more radial bores (22) for distributing the blowing agent, for example, through the permeable sintered metal surface. The design of this porous or permeable section (16) can take, for example, the form of a sleeve, cylinder, hollow cylinder or consist of at least one of the plugs or rings used in the screw's shaft.

The porous or permeable section (16) can be formed from sintered metal or other permeable material such as, for example, ceramic.

The bores (20, 22) are upstream of the feed hopper (5) and connected to an blowing agent feed device. This connection is effected by a sealing case (24) with a core and a screw-on cover that surrounds the plasticizing screw (3).

The sealing case (24) is installed between the plasticizing cylinder (2) and a drive mechanism (not depicted) for the plasticizing screw (3) and is secured against twisting. The sealing case (24) moves simultaneously with the axial movement of the plasticizing screw (3). The axial travel of the plasticizing screw (3) corresponds, for example, to three times the diameter of the plasticizing cylinder (2). The sealing case (24) is fitted with special rotary seals and is centered on the screw's shaft with slip rings. Mechanical clamping pieces prevent an axial displacement of the sealing case (24). Slip ring seals or rotary shaft seals can be used as the rotary seals (26). One or more radial bores (28) connect the pressure chamber of the blowing agent feed device (18) to the axial bore (20) along the longitudinal axis of the plasticizing screw (3).

When the blowing agent is distributed over the surface of the section (16), shearing elements (30) and mixing elements (32), both designed to function as pumps, distribute and disperse the polymer/blowing agent solution. Both the geometry and the order of the shearing elements (30) and mixing elements (32) may deviate from that depicted in the only figure.

An advantageous feature is that the blowing agent feed device (18) is supplied with the blowing agent from commercially available pressure cylinders. During each of the stages for dosing the polymeric material, an electrically, pneumatically, or hydraulically actuated valve (34) connects the blowing agent supply—if necessary throttled through a pressure-reducing valve—to the high-pressure sealing case (24).

What is claimed is:

1. A method for injection molding foamed molded parts by using a blowing agent in an injection molding unit comprising the steps of:

introducing polymer material into an injection molding unit which includes a plasticizing screw movable in axial direction and rotating within a plasticizing cylinder for plasticizing a polymer melt, wherein the plasticizing screw includes a permeable section downstream of a metering zone thereby creating a fluid injection area feed zone, supplying a physical blowing agent to the polymer melt by feeding the blowing agent via a passage in the plasticizing screw to the permeable section and introducing the blowing agent into the melt flow via the fluid injection area feed zone whereby the blowing agent is introduced broadly across the fluid injection area feed zone into the polymer melt in a uniform manner, homogenizing the polymer/blowing agent mixture, injecting the homogenized polymer-blowing agent mixture into a mold.

2. The injection molding method according to claim 1, wherein the homogenization of polymer/blowing agent mixture is effected through action by mixing and shearing elements that are affixed to the plasticizing screw, wherein the mixing and shearing elements exhibit a same effective length during the course of fluid injection.

3. The injection molding method according to claim 1, wherein the blowing agent is fed directly from a pressure container via a sealing case provided at the plasticizing screw.

4. The injection molding method according to claim 1, wherein the blowing agent is injected during a dosing phase.

5. An injection molding method according to claim 2, wherein the shearing elements provided at the plasticizing screw serve to improve the distribution of the blowing agent in the melt flow further downstream of the fluid injection area thereby shortening a path of diffusion.

6. The injection molding method according to claim 1, wherein the polymer/blowing agent mixture is being thermally and substantively homogenized through the action of the mixing elements.

7. An injection molding machine for the injection molding of foamed molded parts of polymer material comprising:

a plasticizing cylinder and a plasticizing screw for rotating within the cylinder and movable in axial direction for transporting a polymer melt through the plasticizing cylinder, said plasticizing screw having a permeable section downstream of a metering zone and an internal passageway of the plasticizing screw to the permeable section, a feed device for supplying a physical blowing agent through the internal passageway to the permeable section where the blowing agent interacts with the permeable section such that the blowing agent is broadly introduced into the polymer melt through an entire surface of the permeable section.

8. The device according to claim 7, wherein the plasticizing screw has a reduced diameter in an area of the permeable section.

9. The device according to claim 7, wherein the feed device includes a high pressure sealing case radially enclosing the plasticizing screw for feeding the blowing agent into the plasticizing screw during a dosing phase.

10. The device according to claim 7, wherein a length of the plasticizing cylinder is approximately twenty times that of a diameter of the plasticizing screw.

11. The device according to claim 10, wherein the length is approximately twenty-five times that of the diameter.

12. The device according to claim 9, wherein the high-pressure sealing case is supplied with the blowing agent from at least one pressure container.

13. A device according to claim 9, wherein the high-pressure sealing case is secured against rotation and movable in axial direction, simultaneously with an axial movement of the plasticizing screw.

14. The device according to claim 9, wherein the sealing case is fitted with rotary seals including pre-stressed springs for sealing the high-pressure sealing case against the rotating plasticizing screw.

15. The device according to claim 9, wherein the high-pressure sealing case is sealed against the rotating plasticizing screw with slip ring seals.

16. The device according to claim 9, wherein the permeable section forms a surface contact with the polymer melt in the plasticizing cylinder.

17. The device according to claim 9, wherein the permeable section is configured as a member selected from the group consisting of a sleeve, cylinder, hollow cylinder and at least one plug or ring used in the screw shaft.

18. The device according to claim 7, wherein the permeable section is made of a porous material.

19. The device of claim 18, wherein the material is sintered metal or a ceramic material.

20. The device according to claim 7, wherein the passage in the plasticizing screw is a bore along a longitudinal axis through which the blowing agent is fed to the permeable section.

21. The device according to claim 7, wherein the plasticizing screw is provided on an outer circumference and downstream of the permeable section with shearing elements.

22. The device according to claim 7, wherein the plasticizing screw is provided on an outer circumference and downstream of the permeable section with mixing elements.

* * * * *